United States Patent
Joret et al.

(10) Patent No.: US 6,235,343 B1
(45) Date of Patent: May 22, 2001

(54) PROCESS FOR DEPOSITING A METAL-OXIDE-BASED LAYER ON A GLASS SUBSTRATE AND GLASS SUBSTRATE THUS COATED

(75) Inventors: Laurent Joret, Paris; Isabelle Berthelot, Aulnay Sous Bois, both of (FR)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/335,886

(22) Filed: Jun. 18, 1999

(30) Foreign Application Priority Data

Jun. 19, 1998 (FR) .................................. 98/07769

(51) Int. Cl.[7] ........................................ B05D 5/06
(52) U.S. Cl. .............................................. 427/166
(58) Field of Search ................................. 427/166

(56) References Cited

U.S. PATENT DOCUMENTS

| | | | |
|---|---|---|---|
| 4,859,496 | 8/1989 | Toyonaga et al. | ............. 427/53.1 |
| 5,304,394 | 4/1994 | Sauvinet et al. . | |
| 5,397,920 | * 3/1995 | Tran | ......................... 257/749 |
| 5,698,262 | * 12/1997 | Soubeyrand | .................. 427/255.3 |
| 5,744,215 | * 4/1998 | Neuman | ............................ 428/141 |
| 5,773,086 | * 6/1998 | McCurdy et al. | ............... 427/255.3 |
| 5,939,201 | * 8/1999 | Boire et al. | ........................... 428/432 |

FOREIGN PATENT DOCUMENTS

| | | |
|---|---|---|
| 0 518 755 | 2/1992 | (EP) . |
| 0 795 522 A1 | 9/1996 | (EP) . |
| 0 857 700 | 8/1998 | (EP) . |
| 2 736 632 | 1/1997 | (FR) . |
| 2 759 362 | 8/1998 | (FR) . |
| WO 93/12892 | 7/1993 | (WO) . |
| WO 96/11887 | 4/1996 | (WO) . |
| WO 96/11888 | 4/1996 | (WO) . |

* cited by examiner

Primary Examiner—Shrive Beck
Assistant Examiner—Jennifer Calcagni
(74) Attorney, Agent, or Firm—Pennie & Edmonds LLP

(57) ABSTRACT

The invention relates to a process for depositing a layer based on a fluorine-containing metal oxide, especially a layer of fluorine-doped tin oxide $F:SnO_2$, on a glass substrate by a chemical vapor deposition technique using at least two precursors, including at least one metal precursor and at least one fluorine precursor. According to the invention, the fluorine precursor consists essentially of nitrogen trifluoride $NF_3$.

13 Claims, 1 Drawing Sheet

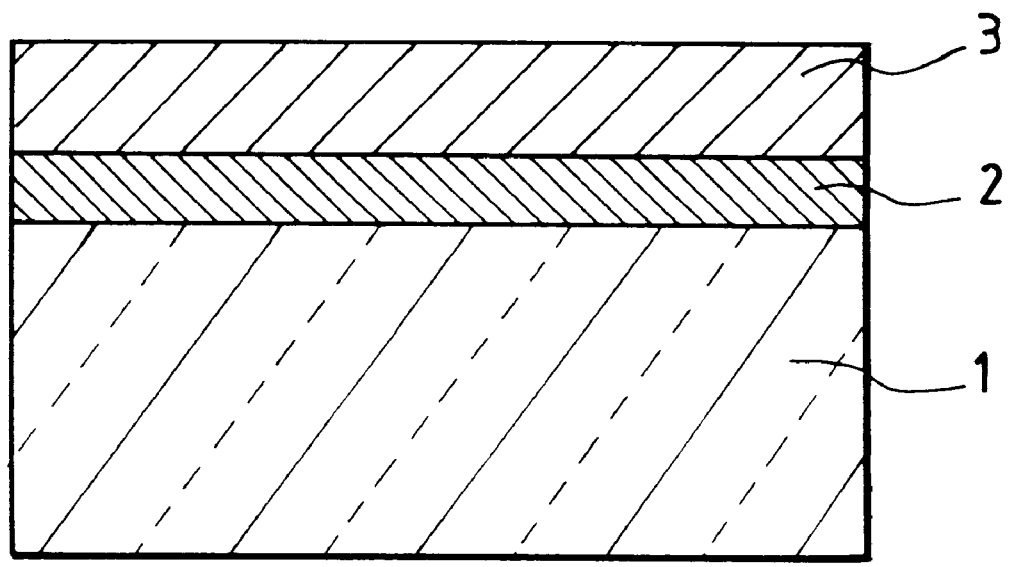

PROCESS FOR DEPOSITING A METAL-OXIDE-BASED LAYER ON A GLASS SUBSTRATE AND GLASS SUBSTRATE THUS COATED

BACKGROUND OF THE INVENTION

The present invention relates to a process for depositing a metal-oxide-based layer on a glass substrate. It also relates to the glass substrate according to this process and to its applications.

It is well known in the prior art to use techniques called "pyrolysis" to coat a glass substrate with one or more thin layers, and to do so for the purpose of conferring particular properties on it, especially electrical properties, thermal properties, mechanical properties, etc.

These techniques consist in spraying "precursors", for example of an organometallic type, in gas form or in powder form or in liquid form, by themselves or in solution in a liquid, onto the surface of the substrate which is heated to a high temperature.

The said precursors, upon contact with the substrate, decompose thereon, leaving, for example, a metal, oxide, oxynitride or nitride layer. The advantage of pyrolysis is well understood: it resides in the fact that it allows layers to be deposited directly on the ribbon of glass in a line for manufacturing flat glass of the float type, in a continuous manner, and also in the fact that the deposited layers adhere strongly to the substrate.

Among these layers, it has been known for a very long time that tin-oxide-based layers are particularly advantageous since their properties, especially electrical and optical properties, make the coated glass substrates useful for a good number of applications.

Many tin precursors have already been tested successfully in the past, particularly those which can be vaporized at the surface of the hot glass using one of the aforementioned techniques, called CVD (Chemical Vapour Deposition).

In order to improve the electrical properties of these tin-oxide based layers mentioned above, attempts have been made to incorporate one or more dopants into the oxide. Several materials have been extensively tested in this regard, but the element which has provided most adaptable for tin oxide is fluorine.

Always with a concern to achieve doping efficacy, efforts have therefore been made to formulate, from a given tin precursor, a fluorine precursor which is the most appropriate for the tin precursor, more particularly when it is deposited by chemical vapour deposition (CVD).

To date, the many formulations that have been produced result in coatings consisting of layers of the aforementioned F:SnO$_2$ type on glass substrates by chemical deposition that are generally satisfactory in terms of quality and with regard to the level of optical and/or electrical performance achieved.

However, whatever the chemical nature and physical form of each of the fluorine and tin precursors, no process for depositing layers formed on glass substrates using these precursors has achieved a high enough efficiency.

This is because in order for a defined F:SnO$_2$ layer thickness to be obtained, a large amount of tin precursor is needed.

SUMMARY OF THE INVENTION

The object of the invention was therefore to improve the efficiency of the process for depositing a layer based on fluorine-doped tin oxide F:SnO$_2$ on a glass substrate by chemical vapour deposition, especially without impairing the quality of the coating and the level of optical and/or electrical performance achieved.

To do this, the subject of the invention is a process for depositing a layer based on a fluorine-containing metal oxide, especially a layer of fluorine-doped indium oxide or a layer of fluorine-doped tin oxide of the F:SnO$_2$ type, on a glass substrate by chemical vapour deposition using at least two precursors, including at least one metal precursor and at least one fluorine precursor. According to the invention, the fluorine precursor comprises nitrogen trifluoride NF$_3$.

BRIEF DESCRIPTION OF THE DRAWING

FIG. 1 is a cross-sectional view of the glass substrate of the present invention.

DETAILED DESCRIPTION OF THE INVENTION

According to one characteristic of the invention, if the intended layer is based on fluorine-doped tin oxide F:SnO$_2$, the metal precursor contains tin Sn.

By this selective choice of fluorine precursor, the deposition efficiency of the aforementioned process has been considerably increased compared with the processes of the prior art. It should be mentioned that, within the contest of the invention, the expression "deposition efficiency" should be understood to mean the ratio of the thickness of the layer obtained to the amount of tin needed to obtain this layer.

Furthermore, such an increase was not achieved at the expense of the level of optical and electrical performance of the layer obtained.

Finally, the process according to the invention does not impair the quality of the layer obtained, the decomposition of the fluorine precursor selected leaving no impurity in the layer.

According to a very advantageous characteristic of the invention, the tin precursor has the form SnR$_x$Cl$_{4-x}$, where R is a linear or branched hydrocarbon radical preferably having 1 to 6 carbon atome. It may be dimethyltin dichloride Me$_2$SnCl$_2$ or monobutyltin chloride.

Such a precursor, in combination with the fluorine precursor according to the invention, makes it possible to achieve a level of electrical performance of the F:SnO$_2$ layer obtained which is even higher compared with those already achieved in the prior art or with those achieved using another tin precursor.

Of course, within the context of the invention, the tin precursor may also be chosen from tin tetrachloride SnCl$_4$ or monobutyltin trichloride C$_4$H$_9$SnCl$_3$, hereinafter referred to as MBTCl.

Preferably, the coating is deposited according to the invention on the glass substrate at a temperature of between 400 and 800° C., especially between 550 and 750° C.

This temperature range is particularly advantageous insofar as it is compatible with deposition on a float line.

Advantageously, the molar ratio of the amount of fluorine precursor to the amount of metal precursor, especially tin precursor, is between 0.1 and 20%.

It is preferably, according to the invention, particularly when the metal precursor, especially tin precursor, does not contain oxygen, for the deposition to be carried out according to the invention using at least one compound having an oxidizing character, of the O$_2$ and/or H$_2$O type.

It is also preferable for the metal-oxide-based layer, especially one based on fluorine-doped tin oxide $F:SnO_2$, to be continuously deposited on a ribbon of float glass.

In particular, when the glass substrate is of the silica-soda-lime type, the deposition according to the invention is advantageously carried out between the float bath and the lehr.

When the glass substrate has a chemical composition suitable for the manufacture of plasma screens, the deposition according to the invention is preferably carried out in the float bath chamber or in the lehr.

The invention also relates to a glass substrate coated with a layer based on fluorine-doped tin oxide $F:SnO_2$ obtained according to the aforementioned process. This substrate is noteworthy in that the layer has a resistance per square of at most 100 Ω, the coated substrate having a light transmission $T_L$ of at least 75%.

According to one characteristic, the layer based on fluorine-doped tin oxide $F:SnO_2$ may form part of a stack of the type:

glass/$SiO_xN_yC_z$/$F:SnO_2$.

In this type of stack, the sublayer may advantageously have a refractive index and a geometrical thickness which are selected so as in particular to adjust the optical appearance of the substrate, particularly in reflection.

For this purpose, the layer based on fluorine-doped tin oxide $F:SnO_2$ may advantageously be combined with an anti-iridescence layer.

An $SiO_xN_yC_z$ layer particularly suitable for this type of stack is the one described in French Patent Application FR 97/01468 filed by the Applicant on Feb. 10, 1997, published under No. FR-2,759,362 and equivalent to European Patent EP-0,857,700. This is because such a layer has the advantage of being particularly strong from a mechanical standpoint.

According to an advantageous variant (when y is zero), the SiOC layer, combined with the layer according to the invention, may be obtained by chemical vapour deposition, especially using silane and ethylene, as described in Patent Application EP-0,518,755.

This variant is also advantageous, especially when the $F:SnO_2$ layer according to the invention is intended to form part of electrodes, particularly when it is intended to coat the front surfaces of emissive screens.

The aforementioned $SiO_xN_yC_z$-based layer prevents alkalis in the glass from diffusing into the conducting layer according to the invention, and therefore protects the latter.

The abovementioned sublayers may be uniform in terms of their thickness but they may also have a degree of compositional inhomogeneity through their thickness, for example so as to modulate their refractive index and to allow optimum optical and/or chemical compatibility with the $F:SnO_2$ layer, obtained according to the invention, which lies above it.

This "gradient" layer may be obtained using the same deposition technique as that according to the invention for depositing $F:SnO_2$, i.e. by chemical vapour deposition, but by using a nozzle suitable for creating chemical gradients, such as that described in Patent Application FR-2,736,632.

As regards the thickness of the $F:SnO_2$ layer according to the invention, this obviously depends on the intended applications.

When the substrate defined above is used to manufacture solar-protection windows of the filtering and/or low-emissivity type or to manufacture glazed parts of domestic electrical appliances, of the oven door or refrigerator door type, the layer preferably has a geometrical thickness of at least 250 nm.

When the substrate according to the invention is used to manufacture "front" and/or "rear" surfaces of emissive screens of the flat-screen type, such as plasma screens, it preferably has a chemical composition comprising the following constituents, in proportions by weight:

|      |                        |         |
|------|------------------------|---------|
|      | $SiO_2$                | 55–65%  |
|      | $Al_2O_3$              | 0–5%    |
|      | $ZrO_2$                | 5–10%   |
|      | $B_2O_3$               | 0–3%    |
|      | $Na_2O$                | 2–6%    |
|      | $K_2O$                 | 5–9%    |
|      | MgO                    | 0–6%    |
|      | CaO                    | 3–11%   |
|      | SrO                    | 4–12%   |
|      | BaO                    | 0–2%    |
| with | $Na_2O + K_2O$         | ≧10%    |
|      | MgO + CaO + SrO + BaO  | >11%    |

Further details and advantageous characteristics will emerge below on reading the illustrative, but non-limiting, embodiments of the invention, with reference to the single figure.

Firstly, it should be pointed out that, in this figure, the proportions relating to the relative thicknesses of the various materials have not been respected for the sake of clarity.

The single figure shows a clear silica-soda-lime glass substrate 1 with a thickness of 4 millimeters, for example one sold under the brand name PLANILUX by Saint-Gobain Vitrage, this substrate being coated with a thin layer 2 based on silicon oxycarbide SiOC with a refractive index of 1.7 over which there is a layer 3 based on fluorine-doped tin oxide $F:SnO_2$.

In all the following examples, the latter layer is deposited using a chemical vapour deposition technique by means of a suitable nozzle, known per se.

This nozzle is placed either in a furnace with a static substrate (Examples 1 and 2) or in a continuous furnace (Examples 3 to 6).

It should be mentioned that, in each case, the atmosphere in the furnace, that is to say the atmosphere with which the $F:SnO_2$ layer obtained is in contact, is based on nitrogen $N_2$.

It should also be mentioned that, prior to depositing the $F:SnO_2$ layer, the glass substrate is coated with the aforementioned silicon oxycarbide layer using the technique described in Patent EP 0,518,755.

Examples 1, 3 and 5 are produced according to the invention.

Examples 2, 4 and 6 according to the prior art are given as comparative examples.

The operating conditions used for carrying out the deposition are given in detail below for each of the examples.

EXAMPLES 1 AND 2

The glass substrate is laid on a metal susceptor which is placed inside a quartz tube.

The inside of this tube is then heated by infrared lamps and brought to a temperature of about 630° C. As regards the quartz walls, these remain much cooler.

In these examples, the tin precursor used is dimethyltin dichloride $Me_2SnCl_2$.

The latter is vaporized using a so-called bubbling technique. The tin precursor is placed in a bubbler through which a carrier gas passes, in this case nitrogen $N_2$. The carrier gas $N_2$ is thus diffused through the tin precursor and leaves the bubbler saturated with vapour of the tin precursor.

The tin precursor $Me_2SnCl_2$ is maintained at a temperature of about 115° C. during bubbling.

The flow rate of the carrier nitrogen is kept constant at 0.1 l/min.

In Example 1, the fluorine precursor (dopant) used is, according to the invention, nitrogen trifluoride $NF_3$. This is diluted in nitrogen $N_2$ to a concentration of about 10%.

In Example 2, the fluorine precursor (dopant) used is trifluoroacetic acid $CF_3COOH$ placed in a bubbler under the same conditions as above and maintained at a temperature of about −10° C. during bubbling.

In each of these examples, the carrier gas laden with tin precursor is mixed with a stream of oxygen and with a stream of water vapour in a bubbler maintained at 2° C.

Table 1 below reiterates the nature of the tin and fluorine precursors used:

TABLE 1

|  | EXAMPLE 1 | EXAMPLE 2 |
| --- | --- | --- |
| Nature of the tin precursor (A) | dimethyltin dichloride $Me_2SnCl_2$ | dimethyltin dichloride $Me_2SnCl_2$ |
| Nature of the fluorine precursor (B) | nitrogen trifluoride $NP_3$ | trifluoroacetic acid $CF_3COOH$ |

Table 2 below gives, for Examples 1 and 2 respectively, the flow rates of the stream of oxygen $O_2$ and of the carrier nitrogen through water vapour $H_2O$ in l/min., the flow rate of the fluorine precursor in l/min., the thickness (th) in nanometers of the $F:SnO_2$ layer obtained and the deposition time, in minutes, used for depositing the thickness (th) of the aforementioned layer. It also gives the value of the light transmission $T_L$ as a percentage, measured under illuminant $D_{65}$, as well as the value of the resistivity $\rho$ in ohm.cm.

TABLE 2

|  | EXAMPLE 1 | EXAMPLE 2 |
| --- | --- | --- |
| Flow rate of $O_2$ (l/min.) | 0.4 | 0.4 |
| Flow rate of carrier nitrogen through water vapour (l/min.) | 0.1 | 0.1 |
| Flow rate of the fluorine precursor (l/min.) | 0.05 | 0.1 |
| Deposition time | 1 min. 30 s | 4 min. 30 s |
| Thickness (th) of the $F:SnO_2$ layer | 300 | 315 |
| $T_L$ (%) | 82.9 | 83.5 |
| Resistivity $\rho$ (ohm.cm) | $3.9 \times 10^{-4}$ | $4.0 \times 10^{-4}$ |

It is clearly apparent from this table that the deposition efficiency is much better for Example 1 according to the invention than Example 2 and therefore that nitrogen trifluoride $NF_3$ considerably improves the efficiency when the tin precursor used is dimethyltin dichloride $Me_2SnCl_2$.

This is because the rate of deposition (the ratio between the thickness th of the $F:SnO_2$ layer obtained to the deposition time) is increased by a ratio of approximately 2.85 in the case of a nitrogen flow rate through $Me_2SnCl_2$ of 0.1 l/min.

This increase in the rate of deposition was not achieved at the expense of the optical and electrical properties which are very much the same in the above-mentioned two examples.

EXAMPLES 3 TO 6

The glass substrate is placed in a continuous furnace and is moved at a speed of about 40 cm/min. In addition, the temperature of the glass is maintained in the region of 620° C.

The bubbling technique is the same as that used in Examples 1 and 2.

EXAMPLE 3

The tin precursor used is dimethyltin dichloride $Me_2SnCl_2$ maintained at a temperature of about 120° C. during bubbling.

The fluorine precursor used is, according to the invention nitrogen trifluoride $NF_3$ diluted in nitrogen $N_2$ to a concentration of about 10%. The carrier gas $N_2$ laden with dimethyltin dichloride $Me_2SnCl_2$ is mixed with a stream of oxygen $O_2$ and a stream of water vapour.

EXAMPLE 4

The tin precursor used is demethyltin dichloride $Me_2SnCl_2$ maintained under the same temperature conditions as in Example 3.

The fluorine precursor used is trifluoroacetic acid $CF_3$ maintained at a temperature of about 40° C. The carrier gas $N_2$ laden with dimethyltin dichloride $Me_2SnCl_2$ and the streams of oxygen $O_2$ and water vapour $H_2O$ are strictly identical to those in Example 3.

EXAMPLE 5

The tin precursor used is monobutyltin trichloride MBTCl maintained at a temperature of 145° C. during bubbling. The fluorine precursor used is, according to the invention, nitrogen trifluoride $NF_3$ diluted in nitrogen $N_2$ to a concentration of 10%. The carrier gas $N_2$ laden with MBTCl is mixed with a stream of oxygen $O_2$ and a stream of water vapour $H_2O$ maintained at 40° C.

EXAMPLE 6

The tin precursor used is the one used for Example 5, under the same temperature conditions. The fluorine precursor used is trifluoroacetic acid $CF_3COOH$ maintained at a temperature of 40° C.

The carrier gas $N_2$ laden with the tin precursor is mixed with a stream of oxygen $O_2$ and a stream of water vapour maintained at 40° C.

Table 3 below reiterates the nature of the tin and fluorine precursors used in the various Examples 3 to 6:

TABLE 3

|  | EXAMPLE 3 | EXAMPLE 4 | EXAMPLE 5 | EXAMPLE 6 |
| --- | --- | --- | --- | --- |
| Nature of the tin precursor | $Me_2SnCl_2$ | $Me_2SnCl_2$ | MBTCl | MBTCl |
| Nature of the fluorine precursor | $NF_3$ | $CF_3COOH$ | $NF_3$ | $CF_3COOH$ |

Table 4 below gives, for each of Examples 3 to 6 respectively, the flow rates of the stream of oxygen $O_2$ and the stream of carrier nitrogen through water vapour $H_2O$ in l/min., the flow rate of the fluorine precursor in l/min., the flow rate of the tin precursor in l/min. and the thickness (th) in nanometers of the $F:SnO_2$ layer obtained.

It also gives the value of the light transmission $T_L$ as a percentage, measured under illuminant $D_{65}$ as well as the value of the resistivity $\rho$ in ohm.cm.

TABLE 4

| | EXAMPLE 3 | EXAMPLE 4 | EXAMPLE 5 | EXAMPLE 6 |
|---|---|---|---|---|
| $O_2$ Flow rate (l/min.) | 1.7 | 2.3 | 3.0 | 3.2 |
| Flow rate of carrier $N_2$ through $H_2O$ vapour (l/min.) | 0.5 | 0.5 | 0.4 | 0.5 |
| Flow rate of the fluorine precursor (l/min.) | 0.05 | 0.075 | 0.1 | 0.05 |
| Flow rate of the tin precursor (l/min.) | 1.1 | 1.9 | 1.6 | 2.7 |
| Thickness (th) of the $F:SnO_2$ layer obtained (nm) | 330 | 330 | 330 | 330 |
| $T_L$ (%) | 82.6 | 82.8 | 83.1 | 82.5 |
| $\rho$ (ohm.cm) | $4.7 \times 10^{-4}$ | $4.9 \times 10^{-4}$ | $5.2 \times 10^{-4}$ | $5.3 \times 10^{-4}$ |

Comparing respectively, on the one hand, Example 3 according to the invention with Example 4 and, on the other hand, Example 5 according to the invention with Example 6, it may be seen that:

the precursor according to the invention, $NF_3$, increases the deposition efficiency since, for a given thickness (330 nm) of the $F:SnO_2$ layer, the amount of tin precursor used (proportional to the flow rate) is much less;

this increase in the deposition efficiency was not achieved at the expense of the optical and electrical performance.

Furthermore, it was found that the fouling of the nozzle used in Examples 3 and 5 according to the invention was much less than that normally found.

It was observed that the layers obtained according to the invention were, for the same thicknesses, less absorbent than the layers obtained according to the prior art. Thus, the light transmission of Example 5 is slightly superior to that of Example 6, which means that the absorption is lower.

Moreover, it was also observed that the layers obtained according to the invention had electrical properties identical and even sometimes superior to those obtained according to the prior art.

Finally, Examples 3 to 6 were repeated, the run speed of the substrate being increased to 1 m/min. so as to approach the run speeds of the ribbon of float glass in an industrial line; it was found that the layers according to the invention maintained the same advantages, namely a better efficiency with similar or even superior optical and electrical performance.

In conclusion, the invention has developed a process for depositing a layer based on fluorine-doped tin oxide $F:SnO_2$ with an improved efficiency without this impairing the electrical and optical performance of the layer.

What is claimed is:

1. A process for providing an oxide coating, which comprises continuously depositing a layer of fluorine-doped tin oxide on a ribbon of float glass by a chemical vapor deposition technique using at least one metal precursor and at least one fluorine precursor to provide the oxide coating thereon, wherein:

the metal precursor contains tin in the form of dimethyltin dichloride or monobutyltin trichloride;

the fluorine precursor consists essentially of nitrogen trifluoride; and the fluorine and metal precursors are present in a molar ratio of between 0.1 and 20.

2. The process of claim 1, wherein the continuous deposition of oxide is accomplished on the float glass in the float bath chamber or in the lehr.

3. The process of claim 1, wherein the coating is deposited on the glass substrate at a temperature from about 400 to 800° C.

4. The process of claim 3, wherein the coating is deposited on the glass substrate at a temperature from about 550 to 750° C.

5. The process of claim 1, wherein the fluorine-doped tin oxide layer is deposited with at least one compound having an oxidizing character.

6. The process of claim 5, wherein the compound having oxidizing character is selected from the group consisting of oxygen and water.

7. A process for providing an oxide coating, which comprises continuously depositing a layer of fluorine-doped indium oxide onto a ribbon of float glass by a chemical vapor deposition technique using at least one metal precursor that contains indium and at least one fluorine precursor, wherein the fluorine precursor consists essentially of nitrogen trifluoride.

8. The process of claim 7, wherein the continuous deposition of oxide is accomplished on the float glass in the float bath chamber or in the lehr.

9. The process of claim 7, wherein the fluorine and metal precursors are present in a molar ratio of between 0.1 and 20.

10. The process of claim 7, wherein the coating is deposited on the glass substrate at a temperature from about 400 to 800° C.

11. The process of claim 10, wherein the coating is deposited on the glass substrate at a temperature from about 550 to 750° C.

12. The process of claim 7, wherein the fluorine-doped indium oxide layer is deposited with at least one compound having an oxidizing character.

13. The process of claim 12, where the compound having oxidizing character is selected from the group consisting of oxygen and water.

* * * * *